United States Patent [19]
McDaniel et al.

[11] Patent Number: 4,596,862
[45] Date of Patent: Jun. 24, 1986

[54] OLEFIN POLYMERIZATION USING CHROMIUM ON FLUORIDED ALUMINOPHOSPHATE

[75] Inventors: Max P. McDaniel; Emory W. Pitzer; Elizabeth A. Boggs; Donald D. Norwood; Fay W. Bailey, all of Bartlesville, Okla.

[73] Assignee: Phillips Petroleum Company, Bartlesville, Okla.

[21] Appl. No.: 685,528

[22] Filed: Dec. 24, 1984

[51] Int. Cl.$^4$ .......................... C08F 4/22; C08F 10/02
[52] U.S. Cl. .................................. 526/106; 502/150; 502/210; 526/348.5; 526/352
[58] Field of Search ................. 526/106, 156

[56] References Cited

U.S. PATENT DOCUMENTS

| | | |
|---|---|---|
| 2,951,816 | 9/1960 | Hogan et al. |
| 4,011,382 | 3/1977 | Levine et al. ...... 526/106 |
| 4,077,904 | 3/1978 | Noshay et al. |
| 4,347,162 | 8/1982 | Invernizzi et al. |
| 4,364,842 | 12/1982 | McDaniel et al. ...... 526/106 |
| 4,364,855 | 12/1982 | McDaniel et al. ...... 526/106 |
| 4,481,301 | 11/1984 | Nowlin et al. ...... 526/156 |

FOREIGN PATENT DOCUMENTS 1391771  4/1975  United Kingdom ............ 526/106

Primary Examiner—Edward J. Smith
Attorney, Agent, or Firm—Archie L. Robbins

[57] ABSTRACT

Ethylene polymer is particularly suitable for the production of tough film is produced under slurry conditions using a fluorided aluminophosphate support and a reaction temperature within the range of 93° to 107° C. in the presence of hydrogen and a small amount of trialkyl boron cocatalyst wherein said aluminophosphate has a phosphorous to aluminum ratio within the very narrow range of 0.15 to 0.4 and wherein said aluminophosphate carrying chromium catalyst is being activated at a temperature within the range of 482° to 704° C. The resulting film is not only substantially superior to film made from the best of the readily available commercial resins but is also better than film made from polymers using a similar catalyst system without the specific combination of parameters of this invention.

5 Claims, No Drawings

OLEFIN POLYMERIZATION USING CHROMIUM ON FLUORIDED ALUMINOPHOSPHATE

BACKGROUND OF THE INVENTION

This invention relates to the polymerization of olefin monomers using a chromium catalyst on an aluminophosphate support.

It is broadly known that the use of aluminophosphate supports for chromium olefin polymerization catalysts gives a superior polymer. However, for certain applications such as film it would be desirable to tailor the resin to further enhance the tear strength and impact strength of the resulting film.

SUMMARY OF THE INVENTION

It is an object of this invention to provide an olefin polymer particularly suitable for film production;

it is a further object of the invention to provide an improved olefin polymerization process; and it is still a further object of this invention to provide film having superior physical properties.

According to this invention an olefin monomer is polymerized at a temperature within the range of 200-225 F. in the presence of 0.1 to 1.5 ppm of a trialkylborane cocatalyst using a chromium catalyst on a fluorided aluminophosphate support activated at a temperature within the range of 900-1300 F., said support having a P/Al atom ratio within the range of 0.15 to 0.4.

DESCRIPTION OF THE PREFERRED EMBODIMENTS

The aluminophosphate support is made by a method disclosed in McDaniel et al U.S. Pat. No. 4,364,855 the disclosure of which is hereby incorporated by reference. In this method an aluminum salt which will melt is used, with the source of phosphate ions combined with the melt and then neutralized to give the hydrogel. Generally those aluminum salts with a sufficiently low melting point are hydrated. Orthophosphoric acid, orthophosphates such as monoammonium phosphate and diammonium hydrogen phosphate or mixtures of monoammonium and diammonium phosphate are preferred sources of phosphate ions. As disclosed in this patent, some water can be present and thus the method can broadly be viewed as employing a concentrated mass of the acid phase (source of aluminum and source of phosphate ions).

In the preparations involving an aqueous component in the preparation of the aluminophosphate, it is preferred to remove water from the hydrogel by azeotropic distillation or washing with a volatile, water-miscible, low surface tension organic liquid. In preparation techniques not employing water, any small amount of water carried over from the water of hydration or from the base used in the neutralization can be removed by conventional spray drying, tray drying or oven drying thus avoiding the necessity for azeotropic distillation. However, even in these situations, if it is desired to water wash the hydrogel then azeotropic distillation or washing with a solvent is desirable. After drying of water in this manner, the gel is preferably dried of solvent under mild conditions, for instance by heating at a temperature of 25° to 110° C., most preferably under vacuum.

It may be desirable in some instances to coprecipitate other materials with the phosphate or have other materials present during the gelation. For instance, the chromium compound such as chromium nitrate can be introduced with the reactants.

The neutralization can be carried out by either adding the acid phase to the base phase (neutralizing agent) or vice versa, or by adding both to a third vessel. One suitable practice is to drip the acid phase into the base phase or otherwise add the acid phase relatively slowly into the base phase with stirring. This results in the production of small spheres or balls of the orthophosphate, particularly where the melt of aluminum salt and source of phosphate ions is dripped or sprayed or otherwise slowly added to a large excess of ammonium hydroxide. The spheres are subsequently collected, washed, dried and calcined.

Gelation occurs spontaneously at a pH of about 4, which is achieved by combining about 72 percent of the neutralizing agent, and it has been found that this is not desirable. Therefore, the neutralization is preferably achieved by either: (1) combining slowly with stirring the acid phase and about 72 percent of the amount of neutralizing agent (base phase) needed for complete neutralization and thereafter quickly adding the rest of the neutralizing agent so as to achieve gelation at a pH of 5 or greater, preferably at least 6, generally 6 to 10, or (2) combining all of the base phase with the acid phase under rapid conditions so as to achieve gelation at a pH of 5 or greater, preferably at least 6, generally 6 to 10.

While any base can be used as the neutralizing agent, concentrated ammonium hydroxide, ammonia gas, or ammonia dissolved in an alcohol or other nonaqueous solvent is preferred. Other suitable neutralizing agents include ammonium carbonate used alone or in combination with ethylene oxide and propylene oxide.

The atom ratio of phosphorus/aluminum must be within the relatively narrow range of from 0.15 to 0.4 preferably 0.2 to 0.3, most preferably about 0.2, thus in all instances giving an amorphous aluminum orthophosphate composition.

While low phosphorous aluminum phosphate can be thought of for convenience as a mixture of aluminum phosphate and alumina, it in fact is not. No alumina is present at all but rather there is a unitary amorphous gel matrix structure in which some of the trivalent $PO_4$ groups of the aluminum phosphate are replaced with trivalent $AlO_3$ groups. Herein such materials are referred to as aluminophosphates.

The chromium compound can be coprecipitated as noted hereinabove or can be added to the hydrogel or xerogel. The term xerogel is used to refer to predominantly amorphous gel resulting from the removal of free water from the hydrogel. For instance, a water-soluble chromium compound such as chromium nitrate, chromium acetate, or $CrO_3$ can be added to the hydrogel. Alternatively, a chromium compound soluble in an anhydrous solvent such as a hydrocarbon can be used to impregnate the xerogel prior to activation. Suitable chromium for such anhydrous impregnation includes tertiary-butyl chromate. The chromium compounds are used in amounts sufficient to give 0.1 to 5 preferably about 1 weight percent chromium based on the weight of the xerogel base plus chromium compound. Preferably the chromium compound is added by means of an aqueous solution of a chromium compound such as chromium nitrate which is added to the hydrogel.

The phosphate support is activated at a temperature within the range of 482° to 704° C. (900°-1300° F.), with 593° to 649° C. (1100°-1200° F.) being preferred. The activating ambient is air or other similar oxygen-containing ambient. The chromium compound is at least predominantly in the hexavalent state after activation. Activation times of 5 minutes to 24 hours, preferably ½ to 10 hours are suitable for the activation or calcining step. The chromium is thought to be reduced in the polymerization zone by the monomer, probably to a plus 2 oxidation state. If desired this reduction can be carried out before the catalyst is contacted with the monomer, for instance in the activation step.

The aluminophosphate must be given a fluoriding treatment. This is preferably done by mixing the xerogel with a solution of a fluoride such as ammonium bifluoride ($NH_4FHF$), ammonium fluoroborate ($NH_4BF_4$), ammonium silicofluoride [$(NH_4)_2SiF_6$] or aluminum fluoride ($AlF_3$). An alcoholic solution of the $NH_4FHF$ is particularly suitable. Also aqueous solutions of these compounds can be used. Alternatively the fluoriding component can be added to the hydrogel or the xerogel after calcining. Also the fluoriding agent can be added to the activator. Suitable fluoriding agents for this include those listed above plus gases such as $PF_3$ or $PF_5$ (phosphorous trifluoride and phosphorous pentafluoride). The preceding are preferred because they contain as the other ion either $NH_4$ which can be driven off, or P or Al which are not harmful to the final catalyst.

The boron cocatalyst is a trialkylborane, the alkyl group having from 1 to 5 carbon atoms per group. Triethylborane (TEB), tripropylborane, and tri-n-butylborane are preferred. The boron compound is used in an amount so as to give an atom ratio of boron to chromium within the range of 0.04:1 to 1.5:1, preferably 0.09:1 to 1.1:1, more preferably 0.09:1 to 0.50:1. Stated in parts by weight per million parts by weight of the diluent, the amount of boron cocatalyst is within the range of 0.1 to 15 ppm, preferably 0.25 to 1.0, more preferably 0.25 to 0.5 ppm.

The boron-containing cocatalyst can be either premixed with the catalyst or added as a separate stream to the polymerization zone, the latter being preferred.

Hydrogen is used in an amount within the range of 0.1 to 1.6 mole percent based on the moles of diluent. Preferably the amounts are within the range of 0.4 to 0.8 mole percent based on diluent. By mole percent is meant the mole percent hydrogen based on the total moles of hydrogen, diluent and ethylene in the off-gas, but this is essentially the same as mole percent based on the moles in the reactor.

By utilizing low levels of TEB based on chromium, hydrogen can be maintained in the cited range to control polymer melt flow, or maintaining hydrogen in the cited range permits the use of low TEB levels which is desirable to control the amounts of low MW polymer. It is this interaction of critical amounts of cocatalyst, hydrogen, reactor temperature and catalyst activation temperature in combination with the fluoriding at the aluminophosphate support which applicants have found surprisingly gives greatly enhanced film properties.

The catalyst of this invention comprising a chromium compound on an aluminophosphate base is used with a trialkylborane cocatalyst to polymerize a monomer system generally consisting essentially of ethylene in a slurry polymerization system using conventional equipment and contacting processes. While the monomer feed is generally essentially ethylene, the polymer produced may have slightly lower density than the 0.960 normally associated with ethylene homopolymer. If desired, a small amount of one or more comonomers selected from mono-1-olefin having 3–8 carbon atoms per molecule can be included in the feed. Preferred are 1-butene, 1-pentene, 1-hexene and 1-octene. If used, the comonomer would be used in an amount within the range of 0.1 to 5 weight percent comonomer in the feed to give a polymer having 98 to 99.9 weight percent ethylene incorporation.

Contacting of the monomer with the catalyst can be effected in any manner known in the art of slurry polymerization. Briefly, this involves suspending the catalyst in an organic medium and agitating the mixture to maintain the catalyst in suspension throughout the polymerization process. The diluent is a normally liquid hydrocarbon such as n-pentane, n-hexane, cyclohexane, n-butane or isobutane. During this polymerization the reactor temperature (temperature of the reactor contents during polymerization) is within the range of 200°–225° F. (93°–107° C.), preferably 210°–220° F. (99°–104° C.), most preferably 210°–215° F. (99°–102° C.). The higher temperatures give polymers having better toughness properties such as tear strength resistance but cause reductions in catalyst productivity.

In an optional more specific embodiment of this invention, the aluminophosphate is mixed with a polar organic liquid acidic composition and worked until a reduction in volume occurs. More specifically this treatment comprises: (1) combining an acid composition in a liquid polar organic compound with the particulate refractory material to give a workable mixture; (2) working the mixture, for instance by stirring, during which time a decrease in volume occurs; (3) shaping the material into beads, pellets, extrudate, bricks or other shapes; (4) drying the shaped mixture; and (5) subjecting the dried product to conventional treatment such as grinding and calcining.

The polar organic compound can be an ester, ketone, aldehyde, alcohol or other normally liquid polar organic compound or mixture thereof. Alcohols are preferred, particularly 1-6 carbon atom alkanols, most preferably methanol because of its hydrophilic nature.

The acid can be either a mineral acid such as nitric acid or hydrochloric acid or sulfuric acid or it can be an organic acid, such as acetic acid, oxalic acid or propionic acid, for instance. Alternatively, instead of an acid as such, a compound imparting acidic characteristics to the composition can be used to produce the acid composition. For instance, chromium nitrate can be used to provide both the chromium for the catalyst and the acidic conditions. Generally, the acidic salt will give a pH of 2 to 4 when dissolved in water to form a 0.1M solution. Examples are chromium(III) nitrate, chromium(VI) oxide, aluminum nitrate, $NH_4H_2PO_4$, aluminum sulfate and chromium sulfate. A particularly preferred acidic material is a fluoride such as ammonium bifluoride which not only aids in agglomeration but also gives the surface fluoride treatment.

The amount of acid used is preferably sufficient to give about 0.02 to about 0.5 normality/liter in a polar organic compound.

The working to reduce the volume can be done with any mixing device capable of mixing the composition. The polar organic liquid is preferably used in an amount sufficient to give initial incipient wetness. This is about one volume of liquid per total volume of voids and pore volume of the refractory material. Broadly, liquid in an amount from about 0.1 to 2 times the total volume represented by the voids and the pore volume can be used. Stated another way, the polar organic liquid is preferably used in an amount within the range of 0.3 to 5 preferably 1–3 milliliters per gram of solid particulate aluminophosphate or 1–25 preferably 2–7 milliliters per gram of aluminophosphate on a dry basis when the treatment is done in the gel stage. As the mixing continues, the volume of solids decreases and free liquid is released. The mixing can continue with the mixture getting less viscous because of the free liquid, but preferably, the thus-released liquid is evaporated to keep the consistency the same or more preferably to cause the mass to become more viscous. Eventually, the mass will become, to all outward appearances, a solid, although generally the mixing is stopped short of this point. The reason for this is that in accordance with the invention, voids are reduced and particles are thus agglomerated without significant damage to the pores of the refractory material. Carrying the mixing to the point where the material totally solidifies can result in damage to the pores or in particles which are too strong for being fragmented during polymerization. Stated in terms of mixing time, the mixing time can vary, of course, depending on the intensity, with more intensive mixing requiring less time. Generally 10 minutes to 15 hours, preferably 1 to 3 hours is used.

The terms mixing and working are used herein to describe the procedure employed on the aluminophosphate. In the examples a planetary mixer was used. A granulater has also been used. The procedure is most nearly analogous to kneading bread dough. Hence, machines such as pin granulaters, sigma mixers or banbury-type mixers designed to give intensive working can be utilized. The aluminophosphate can be either new aluminophosphate or the fines resulting from processing of a refractory material, that is the invention can be applied to a refractory material as produced, or a refractory material (with or without having been agglomerated in accordance with the invention) can have fines separated therefrom and the fines only subjected to the acid treatment.

In a second aspect of this specific embodiment, a hydrogel or a gel wherein the water in the pores has been partially or essentially completely replaced with a water miscible volatile liquid organic compound such as an alcohol, preferably a 1–6 carbon atom alcohol, is subjected to the same treatment described hereinabove with respect to the particulate solid material. As with the first aspect, the preferred polar organic compound is methanol.

Although on initial working the gel will have a different consistency than the particulate aluminophosphate, on milling or working of the gel it is reduced in volume due to evaporation of the polar liquid and approaches apparent dryness. Hence the same types of mixing equipment can be used as with the first aspect. In the second aspect the polar organic compound can simply be the material used for removing water from the hydrogel, these materials being water miscible normally liquid volatile polar organic compounds such as alcohols with methanol, as noted hereinabove being preferred. Initially the pores are filled with water i.e. the material is a hydrogel. Milling or mixing can be initiated at this point or after some or essentially all of the water has been displaced with the polar organic compound. The acidic material is combined with the polar organic compound in the same manner as in the first aspect, preferably using an acidic chromium compound so as to impart chromium to the refractory material. After the treatment is complete the resulting milled or mixed material is dried of remaining liquid and calcined in the same manner as in the first aspect. Generally, the milled material is introduced into a hammermill or other device utilizing high speed blades or chains to pulverize the material.

There is one difference between the first and second aspects in that, because the solids content of the gel in the second embodiment is relatively low i.e. 10 to 25 percent generally, a greater amount of polar organic compound is used based on the weight of the refractory material on a dry basis. Generally 1 to 20 preferably 2 to 7 milliliters of polar organic liquid per gram of aluminophosphate based on a solid basis is used, as noted above.

EXAMPLES

The various physical properties of the polymers produced according to the instant invention were measured according to the following procedures.

HLMI, g/10 min; ASTM D 1238-65T, condition F

MI, g/10 min; ASTM D 1238-65T, condition E

Density, g/cc; ASTM D 1505-68

Bell ESCR, $F_{50}$, hrs; ASTM D 1693-70, condition A (50° C.)

Dart impact, g; ASTM D 1709-75. Energy needed to rupture one mil thick film upon impact of a free falling dart. This method establishes the weight of the dart dropped from a height of 26 inches which causes 50 percent of the samples to break. The staircase method is used to determine the 50 percent failure level and the missile weight increment is 15 g. In all instances the film was 1 mil in thickness.

Elmendorf tear, t/mil; ASTM D 1922. This is a modification for polymer film adapted from the Elmendorf tear test used for paper. This method determines the average energy in grams required to propagate a tear through 2.5 inches of film in the machine direction (MD) or transverse direction (TD) as indicated. In all instances the film was 1 mil in thickness.

Spencer impact, joules; ASTM D 3420. This test measures the energy needed to burst and penetrate the center of a one mil thick film specimen mounted between two rings with a $3\frac{1}{2}$ inch (1.38 cm) diameter. The following formula is used to obtain impact values in joules.

$E = RC/100$; E=Energy to rupture, joules; C=apparatus capacity, 1.35 joules; R=scale reading on a 0 to 100 scale.

Fisheyes, count/ft$^2$. The number of fisheyes per square foot of one mil thick film determined visually.

Catalyst productivity is given in terms of g polymer per g solid catalyst per unit average residence time in the loop reactor under steady state conditions, generally about $1\frac{1}{4}$ hours.

In the following invention runs the aluminum phosphate support was prepared by the melt method as disclosed in U.S. Pat. No. 4,364,855 (Dec. 21, 1982), the disclosure of which is hereby incorporated by reference. Specifically, $Al(NO_3)_3 \cdot 9H_2O$ was heated to about 80 C. to form a melt. The quantity of $NH_4H_2PO_4$ necessary to give the desired atom ratio of P/Al was dissolved in the melt, and chromium nitrate was added to give the indicated amount of chromium. Sufficient concentrated $NH_4OH$ was mixed with the melt to neutralize and form a gel. The resulting gel was washed with alcohol and dried.

The aluminophosphate was prepared by contacting an aqueous solution containing sufficient $Al(NO_3)_3$ and $NH_4H_2PO_4$ to produce an atom ratio of P/Al 0.2 to 0.3 as specifically set out in the example. Ammonium hydroxide is added to produce a gel at a pH of about 6. The gel was washed with hot (80° C.) water to remove soluble byproducts and then with isopropanol to reduce the water content. The treated gel was dried at 80° C. in a vacuum oven and the dry product calcined in air at the indicated temperature to produce the final product.

EXAMPLE I

In this example the phosphorous to aluminum ratio was 0.2 and chromium level was 1 weight percent chromium introduced in the form of chromium nitrate to the hydrogel. The activation temperature was 1200 F. In invention Run 2 the dried xerogel was contacted with 3% ammonium bifluoride in methanol and worked prior to activation. The ethylene polymerization was carried out at 210 F. with 0.5 ppm TEB in isobutane with hydrogen as a molecular weight control agent in the amount of 1.49 mole percent based on diluent. Results are set out hereinbelow in Table I.

TABLE I

| Run | Fluorided | Pellet HLMI | Pellet Density | Productivity g/g/hr | Dart Drop (g) | Elmendorf Tear TD,(g) |
|---|---|---|---|---|---|---|
| 1 (Control) | No | 13.2 | 0.9599 | 2560 | 212 | 272 |
| 2 (Invention) | Yes | 11.9 | 0.9551 | 2270 | 234 | 421 |

The data in Table I shows a dramatic improvement in film properties as evidenced by modest improvement in dart drop and a major improvmeent in Elmendorf tear. In this regard it is significant that the control run represents a newly developed product far superior to the resins that have been on the market in the past. The best commercial products would have tear strengths in the machine direction generally of less than 200 or at most 250. Similarly the dart drop impact for the best of commercial resins under similar conditions would generally be less than 200.

EXAMPLE II

The invention runs of Example II were carried out under identical conditions (P/Al=0.2, 1.0% Cr) as those of Example I except 1 percent ammonium bifluoride solution is utilized and the activation was carried out for 5 hours at 1200° F. Results are set forth below in Table II in comparison with two of the best commercial resins readily available on the market.

TABLE II

|  | 3 Invention | 4 Invention | 5 Invention | 6 Invention | 7 Invention | 8 Invention | 9 Hostalen 9225F2 Commercial Control | 10 Arco 6000 Commercial Control |
|---|---|---|---|---|---|---|---|---|
| TEB, ppm | 0.56 | 0.53 | 0.52 | 0.50 | 1.04 | 1.08 | — | — |
| H$_2$ mole % | 1.01 | 0.91 | 0.68 | 0.62 | 0.79 | 0.63 | — | — |
| Productivity g/g | 2,110 | 2,170 | 2,330 | 2,330 | 2,290 | 2,300 | — | — |
| Time, Min. | 75 | 75 | 75 | 75 | 75 | 75 | — | — |
| Melt Index, g/10 min | 0.15 | 0.11 | 0.07 | 0.06 | 0.11 | 0.08 | 0.08 | 0.06 |
| HLMI, g/10 min | 17.4 | 14.2 | 10.1 | 9.0 | 14.2 | 11.5 | 9.6 | 9.3 |
| Density, g/cc | 0.9553 | 0.9549 | 0.9547 | 0.9548 | 0.9555 | 0.9533 | 0.9489 | 0.9526 |
| Flexural Modulus, MPa | 1,230 | 1,230 | 1,200 | 1,240 | 1,240 | 1,240 | 1,200 | 1,340 |
| Flexural Modulus, psi | 178,000 | 178,000 | 174,000 | 180,000 | 180,000 | 179,000 | 174,000 | 194,000 |
| Melt Temperature, °C. | 225 | 226 | 245 | 250 | 225 | 225 | 247 | 237 |
| Dart Impact, g | 212 | 239 | 244 | 274 | 227 | 265 | 170 | 196 |
| Spencer, Joule | 0.45 | 0.58 | 0.56 | 0.62 | 0.45 | 0.49 | 0.40 | 0.38 |
| Tear, MD, g | 32 | 36 | 30 | 34 | 30 | 34 | 25 | 23 |
| Tear, TD, g | 362 | 397 | 285 | 312 | 368 | 323 | 165 | 156 |
| Fisheye/ft$^2$ gel | 8.0 | 9.0 | 7.0 | 7.0 | 8.5 | 7.0 | 5.0 | 15 |

EXAMPLE III

In this example the polymer was made as in Example I except 4 percent solution of ammonium bifluoride was used. Results are set out herein below in Table III in comparison with an example of one of the best of readily available commercial materials.

TABLE III

| Run | 11 Invention | 12 Invention | 13 Holstalen 9255F2 Conventional Control |
|---|---|---|---|
| TEB, ppm | 0.55 | 0.94 | — |
| H$_2$, Mole % | 1.29 | 0.67 | — |
| Hexene-1, Wt. % | 0.29 | 1.73 | — |
| Productivity g/g | 1,610 | 1,210 | — |
| Time, Min. | 75 | 75 | |
| Melt Index, g/10 min | 0.09 | 0.05 | 0.08 |
| HLMI, g/10 min | 13.7 | 9.7 | 9.6 |
| Density, g/cc | 0.9551 | 0.9502 | 0.9489 |
| Flexural Modulus, MPa | 1,210 | 1,070 | 1,200 |
| Flexural Modulus, Psi | 175,000 | 155,000 | 174,000 |
| Dart Impact, g | 226 | 232 | 145 |
| Spencer, Joule | 0.43 | 0.55 | 0.40 |
| Tear, MD, g | 26 | 37 | 23 |
| Tear, TD, g | 480 | 464 | 187 |
| Fisheye/ft$^2$ gel | 20.0 | 16.0 | 5.5 |

EXAMPLE IV

This example demonstrates properties of films made from polymer produced from catalyst identical to that of Example III except the fluoriding was done with a 2 weight percent solution of the ammonium bifluroide. Results are set out herein below in Table IV.

TABLE IV

| Run | 14 Invention | 15 Invention | 16 Invention | 17 Invention | 18 Invention | 19 Invention |
|---|---|---|---|---|---|---|
| TEB, ppm | 0.53 | 0.59 | 0.48 | 0.54 | 0.53 | 0.48 |
| H$_2$ mole % | 1.25 | 1.04 | 0.92 | 1.22 | 1.14 | 0.92 |
| Hexene-I, wt. % | 0 | 0 | 0 | 1.76 | 1.73 | 0 |

TABLE IV-continued

| Run | 14 Invention | 15 Invention | 16 Invention | 17 Invention | 18 Invention | 19 Invention |
|---|---|---|---|---|---|---|
| Productivity g/g | 2,080 | 2,220 | 2,410 | 1,260 | 1,450 | 2,410 |
| Time, Min. | 75 | 75 | 75 | 75 | 75 | |
| Melt Index, g/10 min | 0.08 | 0.06 | 0.05 | 0.10 | 0.08 | 0.05 |
| HLMI, g/10 min | 12.1 | 10.7 | 7.8 | 14.9 | 13.2 | 7.8 |
| Density, g/cc | 0.9554 | 0.9549 | 0.9549 | 0.9488 | 0.9503 | 0.9549 |
| Flexural Modulus, MPa | 1,200 | 1,210 | 1,190 | 989 | 1,070 | 1,190 |
| Flexural Modulus, psi | 174,000 | 175,000 | 173,000 | 143,000 | 155,000 | 173,000 |
| Melt Temperature, °C. | 226 | 230 | 245 | 230 | 230 | 267 |
| Dart Impact, g | 230 | 229 | 331 | 239 | 246 | 286 |
| Spencer, Joule | 0.47 | 0.57 | 0.56 | 0.55 | 0.57 | 0.52 |
| Tear, MD, g | 32 | 29 | 29 | 35 | 41 | 27 |
| Tear, TD, g | 326 | 389 | 238 | 547 | 512 | 246 |
| Fisheye/ft$^2$ gel | 5.0 | 5.0 | 3.5 | 6.5 | 10.0 | 4.5 |

Of particular interest is run 16 which shows a dart impact strength of 331 grams which is roughly double of what would be expected from the best of the readily available commercial resins under similar conditions.

Further with regard to the data and examples I to IV, it is essential for the comparisons to be made at the same HLMI since it is desirable to have higher HLMI in order to improve processability, but this detracts from the toughness of the film. As can be seen in the comparisons with the commercial control, the polymers of the invention exhibit enhanced properties at the same or even at higher HLMI values. Thus it is possible in accordance with the invention to have both better processability and greater toughness. Many more runs have been made than are reported herein, these runs being representative. In some runs where the invention catalyst is compared with identical catalyst except without the fluoriding, wherein fluorided catalyst is used to produce slightly higher melt of flow, the results are about comparable. With all factors being held constant the advantage for the fluoriding shown in Example I is representative of the consistent beneficial effect of the fluoriding.

While this invention is being described in detail for the purposes of illustration it is not to be construed as limited thereby but it is intended to cover all changes and modifications within the spirit and scope thereof.

We claim:

1. A polymerization process comprising contacting a predominantly ethylene monomer system under slurry polymerization conditions in a hydrocarbon diluent with a catalyst comprising a chromium compound on a fluorided aluminophosphate support produced by combining an aluminum salt with a source of phosphate ions in a concentrated mass and thereafter neutralizing to give a gel, said gel being mixed with an acidic polar organic liquid containing a fluoriding agent and worked until a reduction in volume occurs, said polymerization being carried out utilizing a reaction temperature within the range of 93° to 107° C. in the presence of hydrogen in an amount within the range of 0.1 to 1.5 mole percent based on diluent, a trialkylborane compound wherein the alkyl groups have 1 to 5 carbon atoms per group, in an amount to give a ratio of boron atoms to chromium atoms within the range of 0.04:1 to 1.5:1, said aluminophosphate having a phosphorus to aluminum atom ratio within the range of 0.15 to 0.4, said aluminophosphate carrying said chromium compound having been activated in air at a temperature within the range of about 482° to 704° C.

2. A method according to claim 1 wherein said polar organic liquid is an alcohol and wherein said gel at the time it is worked is in the form of a xerogel.

3. A method according to claim 2 wherein said fluoriding agent is NH$_4$FHF.

4. A method according to claim 3 wherein said alcohol is methanol.

5. A method according to claim 4 wherein said aluminum salt is molten aluminum nitrate and said source of phosphate ions is NH$_4$H$_2$PO$_4$, said neutralizing being carried out using concentrated ammonium hydroxide.

* * * * *